(12) United States Patent
Nakamura (10) Patent No.: US 10,545,475 B2
(45) Date of Patent: Jan. 28, 2020

(54) CONTROL SYSTEM, CONTROL APPARATUS, OBJECT APPARATUS, AND CONTROL METHOD

(71) Applicant: KYOCERA Corporation, Kyoto-shi, Kyoto (JP)

(72) Inventor: Kazutaka Nakamura, Yokohama (JP)

(73) Assignee: Kyocera Corporation, Kyoto (JP)

( * ) Notice: Subject to any disclaimer, the term of this patent is extended or adjusted under 35 U.S.C. 154(b) by 175 days.

(21) Appl. No.: 15/112,666

(22) PCT Filed: Jan. 20, 2015

(86) PCT No.: PCT/JP2015/051330
§ 371 (c)(1),
(2) Date: Jul. 19, 2016

(87) PCT Pub. No.: WO2015/108196
PCT Pub. Date: Jul. 23, 2015

(65) Prior Publication Data
US 2016/0334774 A1    Nov. 17, 2016

(30) Foreign Application Priority Data
Jan. 20, 2014    (JP) .................................. 2014-007718

(51) Int. Cl.
*G05B 13/02* (2006.01)
*G05B 19/042* (2006.01)

(52) U.S. Cl.
CPC ................... *G05B 19/0426* (2013.01); *G05B 2219/35357* (2013.01)

(58) Field of Classification Search
CPC ........................... G05B 15/02; H02J 13/0075; H02J 2003/003; H02J 2003/143; H02J 3/14;
(Continued)

(56) References Cited

U.S. PATENT DOCUMENTS

2001/0031013 A1    10/2001  Stetzler et al.
2003/0149492 A1*   8/2003   Munezane .............. H04L 12/12
                                                              700/12
(Continued)

FOREIGN PATENT DOCUMENTS

EP    2 544 333 A1    1/2013
EP    2 546 955 A1    1/2013
(Continued)

OTHER PUBLICATIONS

Office Action dated Jul. 4, 2017 issued in counterpart Japanese Application No. 2015-557919.
(Continued)

*Primary Examiner* — Zhipeng Wang
(74) *Attorney, Agent, or Firm* — Procopio Cory Hargreaves and Savitch LLP (57) ABSTRACT

An EMS 200 comprises a communicator 210 configured to transmit a request command requesting information indicating a state of an object apparatus 300. The communicator 210 transmits, as the request command, a command including acquisition property requesting a range of values relating to ability of the object apparatus 300 and object information indicating object content of the range.

11 Claims, 4 Drawing Sheets

(58) Field of Classification Search
CPC ............ Y02B 70/3225; Y02B 70/3266; Y02B 90/2653; Y04S 20/222; Y04S 20/242; Y04S 40/126

See application file for complete search history.

(56) References Cited

U.S. PATENT DOCUMENTS

| | | | | |
|---|---|---|---|---|
| 2004/0002779 | A1* | 1/2004 | Shimba | G05B 19/042 700/90 |
| 2007/0124447 | A1* | 5/2007 | Ajitomi | H04L 12/2832 709/223 |
| 2011/0172841 | A1* | 7/2011 | Forbes, Jr. | G01D 4/004 700/292 |
| 2012/0221162 | A1* | 8/2012 | Forbes, Jr. | G01D 4/004 700/295 |
| 2012/0330469 | A1* | 12/2012 | Kinugasa | H02J 3/14 700/286 |
| 2013/0020871 | A1* | 1/2013 | Takehara | H02J 3/14 307/32 |
| 2014/0006823 | A1* | 1/2014 | Lamb | H02J 13/0086 713/323 |
| 2014/0324193 | A1* | 10/2014 | Kitaji | H02J 3/14 700/22 |
| 2015/0001932 | A1* | 1/2015 | Inoue | G05F 1/67 307/24 |

FOREIGN PATENT DOCUMENTS

| | | |
|---|---|---|
| JP | H11-88640 A | 3/1999 |
| JP | 2001-298375 A | 10/2001 |
| JP | 2004-192538 A | 7/2004 |
| JP | 2009-208430 A | 9/2009 |
| JP | 2010-128810 A | 6/2010 |
| WO | WO2013/080984 A1 | 6/2013 |

OTHER PUBLICATIONS

International Search Report and Written Opinion of the International Searching Authority issued by the Japanese Patent Office for International Application No. PCT/JP2015/051330.

Extended European Search Report dated Sep. 7, 2017, issued by the European Patent Office in counterpart European Patent Application No. 15 736894.5.

* cited by examiner

GET COMMAND

M410

| HEADER | CODE | RANGE ACQUISITION PROPERTY | OBJECT PROPERTY |
| --- | --- | --- | --- |
| M411 | M412 | M413 | M414 |

FIG. 5

GET RESPONSE COMMAND

M510A

| HEADER | OBJECT PROPERTY | LENGTH | CLASSIFICATION | MAXIMUM VALUE | MINIMUM VALUE | STEP WIDTH |
| --- | --- | --- | --- | --- | --- | --- |
| M511 | M512 | M513 | M514 | M515A | M516A | M517A |

FIG. 6

GET RESPONSE COMMAND

M510B

| HEADER | OBJECT PROPERTY | LENGTH | CLASSIFICATION | NUMBER | VALUE |
| --- | --- | --- | --- | --- | --- |
| M511 | M512 | M513 | M514 | M515B | M516B |

CONTROL SYSTEM, CONTROL APPARATUS, OBJECT APPARATUS, AND CONTROL METHOD

TECHNICAL FIELD

The present invention relates to a control system that controls an object apparatus provided in a consumer's facility, and a control apparatus, the object apparatus, and a control method that are used in the control system.

BACKGROUND ART

A control system that controls a plurality of object apparatuses (energy management system: EMS) has lately attracted attention (for example, refer to Patent Literature 1). This type of control system includes a control apparatus that controls a plurality of apparatuses, provided therein.

Examples of the control apparatus include a home energy management system (HEMS) provided in a dwelling, a building energy management system (BEMS) provided in a building, a factory energy management system (FEMS) provided in a factory, and a store energy management system (SEMS) provided in a store.

Examples of the plurality of object apparatuses include a decentralized power source, a power storage apparatus, a heat storage apparatus, and a load. The decentralized power source is an apparatus that generates power using natural energy, such as sunlight, wind force, or geotherm. Alternatively, the decentralized power source is an apparatus that generates power using fuel gas, as a fuel cell such as a solid oxide fuel cell (SOFC). The power storage apparatus is an apparatus that stores power as a secondary battery. The heat storage apparatus is an apparatus that converts power into heat and stores the heat as a water heater. Examples of the load include a refrigerator, a lighting equipment, an air conditioning equipment, and a television.

In order to achieve that appropriate communication is performed between the control apparatus and the object apparatuses, standards according to the communication between the control apparatus and the object apparatuses (for example, ECHONET Lite) have been developed. Accordingly, the control apparatus can transmit various control commands to the object apparatuses.

However, when the control apparatus specifies a value which the object apparatuses are not capable of dealing with, by the control commands, errors occur on the side of the object apparatuses. The control apparatus needs to grasp a range of values relating to ability of each of the object apparatuses in advance.

In the above background, it is thought that a message in which the control apparatus requests the range of the values relating to the ability of each of the object apparatuses from the object apparatuses, is defined anew with the standards. Defining this type of message anew is unfavorable in terms of backward capability.

CITATION LIST

Patent Literature

Patent Literature 1: Japanese application publication No. 2010-128810

SUMMARY OF INVENTION

A first aspect is abstracted as a control system comprising: an object apparatus provided in a consumer's facility; and a control apparatus configured to communicate with the object apparatus by transmitting a command to the object apparatus, wherein the control apparatus comprises a first communicator configured to transmit a request command to the object apparatus, the request command requesting information indicating a state of the object apparatus, the object apparatus comprises a second communicator configured to transmit a request response command to the control apparatus, in response to reception of the request command, the request response command including information requested by the request command, the first communicator transmits, as the request command, a command including range acquisition information and object information, the range acquisition information requesting a range of values relating to ability of the object apparatus, and the object information indicating object content of the range, and the second communicator transmits, as the request response command, a command including range information and the object information in a case where the request command includes the range acquisition information, the range information indicating the range of the values relating to the ability.

A second aspect is abstracted as a control apparatus configured to communicate with an object apparatus provided in a consumer's facility, the control apparatus comprising a communicator configured to transmit a request command to the object apparatus, the requesting information indicating a state of the object apparatus, wherein the communicator transmits, as the request command, a command including range acquisition information and object information, the range acquisition information requesting a range of a value relating to ability of the object apparatus, and the object information indicating object content of the range.

A third aspect is abstracted as an object apparatus provided in a consumer's facility and configured to receive a command from a control apparatus, comprising: a communicator configured to transmit a request response command including information requested by a request command, to the control apparatus, in response to reception of the request command requesting information indicating a state of the object apparatus, or configured to transmit a notification command that autonomously notifies the control apparatus of predetermined information, wherein the communicator transmits, as the request response command or the notification command, a command including range information and object information, the range information indicating a range of a value relating to ability of the object apparatus, and the object information indicating object content of the range.

A fourth aspect is abstracted as a control method used in a control system including an object apparatus provided in a consumer's facility and a control apparatus configured to communicate with the object apparatus by transmitting a command to the object apparatus, the control method comprising: a step α of transmitting a request command, from the control apparatus to the object apparatus, the request command requesting information indicating a state of the object apparatus; and a step β of transmitting a request response command including information requested by the request command, from the object apparatus to the control apparatus, in response to reception of the request command, wherein the step α includes a step of transmitting, as the request command, a command including range acquisition information and object information, the range acquisition information requesting a range of values relating to ability of the object apparatus, and the object information indicating object content of the range, the step β includes a step of transmitting, as the request response command, a command including range information and the object information, the range information indicating the range of the values relating to the ability, in a case where the request command includes the range acquisition information.

DESCRIPTION OF EMBODIMENTS

Hereinafter, the control system and the control method according to the embodiment will be described. Note that the same or similar reference signs are applied to the same or similar portions in the following descriptions of the drawings.

It must be understood that the drawings are schematic, and the ratio of each dimension and the like may differ from the real one. Accordingly, specific dimensions and the like should be understood with reference to the following description. Furthermore, it must be understood that, the relationship or ratio of dimensions included in each of the drawings may differ.

OVERVIEW OF EMBODIMENTS

A control system according to the embodiments comprises: an object apparatus provided in a consumer's facility; and a control apparatus configured to communicate with the object apparatus by transmitting a command to the object apparatus. The control apparatus comprises a first communicator configured to transmit a request command to the object apparatus, the request command requesting information indicating a state of the object apparatus. The object apparatus comprises a second communicator configured to transmit a request response command to the control apparatus, in response to reception of the request command, the request response command including information requested by the request command. The first communicator transmits, as the request command, a command including range acquisition information and object information, the range acquisition information requesting a range of values relating to ability of the object apparatus, and the object information indicating object content of the range. The second communicator transmits, as the request response command, a command including range information and the object information in a case where the request command includes the range acquisition information, the range information indicating the range of the values relating to the ability.

According to an embodiment, a control apparatus can request a range of a value relating to ability of an object apparatus from the object apparatus by only adding range acquisition information to a request command (namely, existing message) that requests information indicating a state of the object apparatus. Accordingly, the control apparatus can grasp the range of the values relating to the ability of the object apparatus in advance, inhibiting an alteration with respect to an existing message format, minimally.

First Embodiment (Control System)

Figure 1:
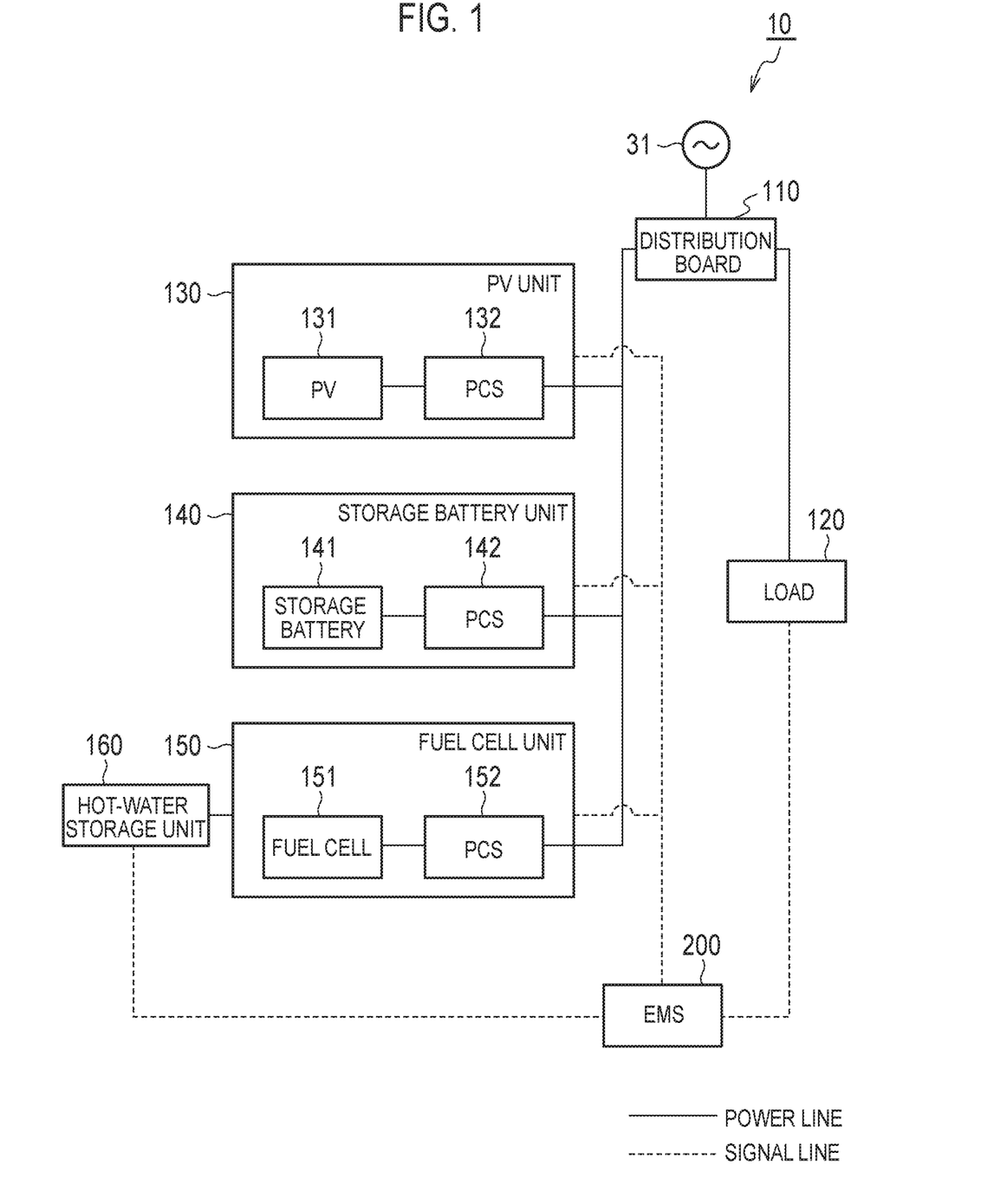
FIG. 1 is a diagram of a consumer's facility 10 according to a first embodiment.

A control system according to a first embodiment will be described below. FIG. 1 is a diagram of the control system according to the first embodiment. According to the first embodiment, the control system is provided in a consumer's facility 10.

The consumer's facility 10 may be, for example, a detached residence, may be a housing complex such as an apartment house, may be a commercial facility such as a building, may be a factory, or may be a store.

As illustrated in FIG. 1, the consumer's facility 10 includes a distribution board 110, a load 120, a PV unit 130, a storage battery unit 140, a fuel cell unit 150, a hot-water storage unit 160, and an EMS 200.

The distribution board 110 is coupled to a grid 31. The distribution board 110 is coupled to the load 120, the PV unit 130, the storage battery unit 140, and the fuel cell unit 150 through a power line.

The load 120 is an apparatus that consumes power supplied through the power line. Examples of the load 120 include a refrigerator, a lighting equipment, an air conditioning equipment, and a television. The load 120 may be a single apparatus or may include a plurality of apparatuses.

The PV unit 130 includes a PV 131 and a PCS 132. The PV 131 is an example of a decentralized power source, and is a photovoltaic power generation apparatus (photovoltaic device) that generates power in response to reception of sunlight. The PV 131 outputs DC power that has been generated. A power generation amount of the PV 131 varies depending on an amount of solar radiation to be irradiated to the PV 131. The PCS 132 is an apparatus that converts the DC power output from the PV 131 into AC power (power conditioning system). The PCS 132 outputs the AC power to the distribution board 110 through the power line. The PCS 132 may convert AC power input from the grid 31 or the fuel cell unit 150 into DC power.

The PV unit 130 may include an actinometer that measures the amount of solar radiation to be irradiated to the PV 131.

The PV unit 130 is controlled by a maximum power point tracking (MPPT) method. In detail, the PV unit 130 optimizes an operating point of the PV 131 (point determined with an operating point voltage value and an operating power value or point determined with the operating point voltage value and an operating point electric current value).

The storage battery unit 140 includes a storage battery 141 and a PCS 142. The storage battery 141 is an example of the decentralized power source, and is an apparatus that stores power. The PCS 142 is an apparatus that converts DC power output from the storage battery 141 into AC power (power conditioning system).

The fuel cell unit 150 includes a fuel cell 151 and a PCS 152. The fuel cell 151 is an example of the decentralized power source, and is an apparatus that generates power using fuel gas. The PCS 152 is an apparatus that converts DC power output from the fuel cell 151 into AC power (power conditioning system).

The fuel cell unit 150 operates with load follow-up control. In detail, the fuel cell unit 150 controls the fuel cell 151 so that the power output from the fuel cell 151 follows power consumption of the load 120.

The hot-water storage unit 160 is an apparatus that converts power into heat and stores the heat. Specifically, the hot-water storage unit 160 includes a hot-water storage tank, and heats water supplied from the hot-water storage tank with waster heat caused by operation of the fuel cell 151 (power generation). In detail, the hot-water storage unit 160 heat the water supplied from the hot-water storage tank, and flows hot water that has been heated back to the hot-water storage tank. The hot-water storage unit 160 includes a backup heat source, and causes the backup heat source to operate so that the water in the hot-water storage tank is heated in a case where the hot water is insufficient. Heat of the backup heat source is generated with power or gas.

The EMS 200 controls power in the consumer's facility 10. Specifically, the EMS 200 is coupled to the load 120, the PV unit 130, the storage battery unit 140, the fuel cell unit 150, and the hot-water storage unit 160 through a signal line. The EMS 200 controls the load 120, the PV unit 130, the storage battery unit 140, the fuel cell unit 150, and the hot-water storage unit 160. The EMS 200 may control the power consumption of the load 120 by controlling an operation mode of the load 120. The signal line that couples the EMS 200 and an object apparatus may be radio or may be cable.

The EMS 200 is coupled to various servers through an external communications network (for example, wide area network and mobile communication network). The various servers store information, such as a purchase unit price of power supplied from the grid, a sale unit price of power flowed back from the PV unit 130 to the grid, a purchase unit price of fuel gas (hereinafter, referred to as energy-charge information).

Alternatively, the various servers store, for example, information necessary for estimating the power consumption of the load 120 (hereinafter, referred to as energy-consumption-estimation information). The energy-consumption-estimation information may be generated, for example, based on a result value of the past power consumption of the load 120. Alternatively, the energy-consumption-estimation information may be a model of the power consumption of the load 120.

Alternatively, the various servers store, for example, information necessary for estimating the power generation amount of the PV 131 (hereinafter, referred to as PV-power-generation-estimation information). The PV-power-generation-estimation information may be an estimated value of the amount of solar radiation to be irradiated to the PV 131. Alternatively, the PV-power-generation-estimation information may be, for example, a weather forecast, a season, or hours of sunlight.

(Control Apparatus)

Figure 2:
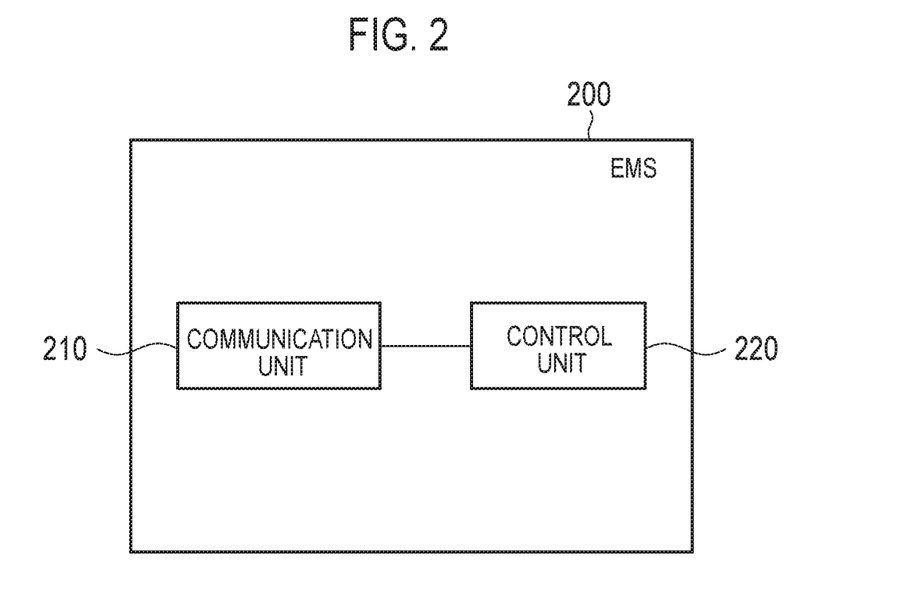
FIG. 2 is a diagram of an EMS 200 according to the first embodiment.

A control apparatus according to the first embodiment will be described below. The EMS 200 according to the first embodiment will be described with reference to FIG. 2. As illustrated in FIG. 2, the EMS 200 includes a communication unit 210 and a control unit 220.

First, the communication unit 210 receives various signals from the apparatuses coupled thereto through the signal line (radio or cable). The communication unit 210 receives a control response command with respect to a control command or a request response command with respect to a request command from object apparatuses (load 120, PV unit 130, storage battery unit 140, fuel cell unit 150, and hot-water storage unit 160). For example, the communication unit 210 receives information indicating the power generation amount of the PV 131, from the PV unit 130. The communication unit 210 receives information indicating a storage amount of the storage battery 141, from the storage battery unit 140. The communication unit 210 receives information indicating a power generation amount of the fuel cell 151, from the fuel cell unit 150. The communication unit 210 receives information indicating a hot-water storage amount of the hot-water storage unit 160, from the hot-water storage unit 160.

In a case where the communication between the EMS 200 and the object apparatuses is performed in an ECHONET Lite method, the communication unit 210 receives messages conforming to the ECHONET Lite method (SET response command, GET response command, INFO command) from each of the apparatuses. The SET response command is a response command with respect to a set command (SET command) including set indication with respect to each of the object apparatuses. The GET response command is a response command with respect to a request command (GET command) requesting information indicating a state of each of the object apparatuses. The INFO command is a command to be transmitted autonomously from each of the object apparatuses, independent of a command from the EMS 200 to each of the object apparatuses.

Here, the communication unit 210 may receive from the various servers through the energy-charge information, the energy-consumption-estimation information, and the PV-power-generation-estimation information. Note that the energy-charge information, the energy-consumption-estimation information, and the PV-power-generation-estimation information may be previously stored in the EMS 200.

Second, the communication unit 210 transmits various signals to the apparatuses coupled thereto through the signal line. For example, the communication unit 210 transmits a control command for controlling the object apparatuses (load 120, PV unit 130, storage battery unit 140, fuel cell unit 150, and hot-water storage unit 160), to the object apparatuses. The communication unit 210 transmits the request command for requesting the information indicating the state of each of the object apparatuses (load 120, PV unit 130, storage battery unit 140, fuel cell unit 150, and hot-water storage unit 160), to the object apparatuses.

In a case where the communication between the EMS 200 and the object apparatuses is performed in the ECHONET Lite method, the communication unit 210 transmits messages conforming to the ECHONET Lite method (SET command, GET command) to each of the apparatuses. The SET command is the set command including the set indication with respect to the object apparatuses. In other words, the SET command is an example of the control command for controlling each of the apparatuses. The GET command is the request command for requesting the information indicating the state of each of the object apparatuses.

According to the first embodiment, the communication unit 210 transmits a command including a range acquisition property (range acquisition information) requesting a range of a value relating to ability of each of the object apparatuses and an object property (object information) indicating object content in the range, as the request command. Here, the values relating to the ability of each of the object apparatuses are, for example, values corresponding to actual ability included in each of the object apparatuses among values relating to the ability defined by standards and the like. The values relating to the ability of each of the object apparatuses include a part or all of the values defined by the standards and the like.

For example, in a case where an air conditioning equipment is an object apparatus, a value relating to ability of the object apparatus is a temperature set point or an operation mode. Examples of the operation mode include an automatic mode, a cooling mode, a heating mode, a dehumidification mode, and a ventilation mode.

In a case where the values relating to the ability of the object apparatus (transmission object value) is the temperature set point, the values relating to the ability of the object apparatus is a value corresponding to an actual set temperature included in the air conditioning equipment. Accordingly, the values relating to the ability of the object apparatus is a continuous value, and can be defined with a minimum value of the temperature set point (for example, 18° C.), a maximum value of the temperature set point (for example, 30° C.), and a step width (for example, 0.5° C. or 1° C.).

Meanwhile, in a case where the values relating to the ability of the object apparatus (transmission object value) is the operation mode, the values relating to the ability of the object apparatus is a value corresponding to an actual operation mode included in the air conditioning equipment. Specifically, examples of the value include existence or nonexistence of options of a wind direction adjustment (for example, only an upper and lower direction, or a left and right direction included), existence or nonexistence of an energy-saving mode, and existence or nonexistence of a timer function. Accordingly, the values relating to the ability of the object apparatus are discontinuous values, and cannot be defined with a representative value like the temperature set point.

Here, when a new object apparatus is detected, the communication unit 210 may transmit the request command including the range acquisition property and the object property, to the new object apparatus. Alternatively, the communication unit 210 may periodically transmit the request command including the range acquisition property and the object property through broadcasting.

The control unit 220 controls an action of the EMS 200. The control unit 220 controls the load 120, the PV unit 130, the storage battery unit 140, the fuel cell unit 150, and the hot-water storage unit 160.

(Object Apparatus)

Figure 3:
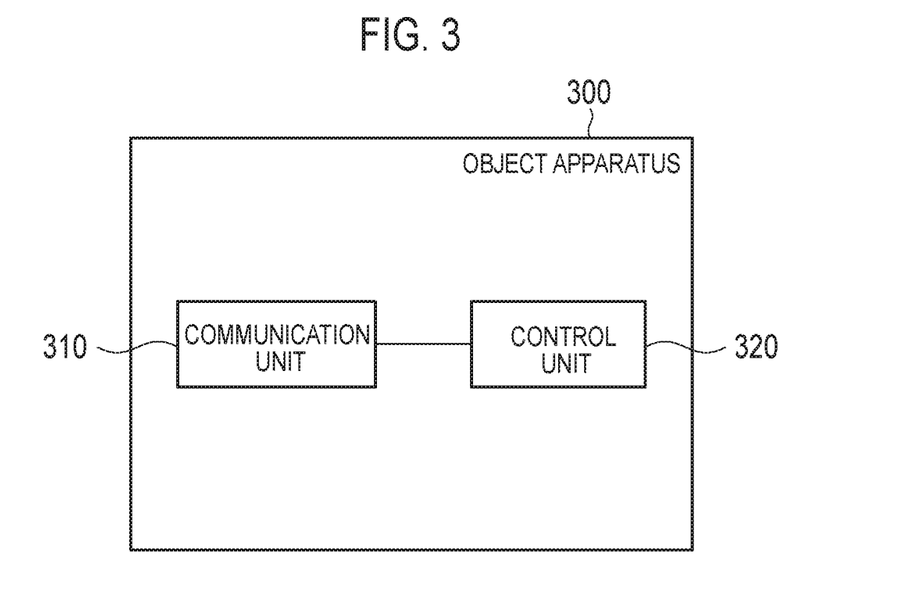
FIG. 3 is a diagram of an object apparatus 300 according to the first embodiment.

An object apparatus according to the first embodiment will be described below. The object apparatus 300 according to the first embodiment will be described with reference to FIG. 3. The object apparatus 300 is, for example, the above load 120, PV unit 130, storage battery unit 140, fuel cell unit 150, or hot-water storage unit 160. As illustrated in FIG. 3, the object apparatus 300 includes a communication unit 310 and a control unit 320.

First, the communication unit 310 receives various signals from the apparatuses coupled thereto through the signal line (radio or cable). The communication unit 310 receives the control command for controlling the object apparatus 300 or the request command requesting information indicating the state of the object apparatus 300, from the EMS 200.

In a case where the communication between the EMS 200 and the object apparatus 300 is performed in the ECHONET Lite method, the communication unit 310 receives the messages conforming to the ECHONET Lite method (SET command, GET command), from the EMS 200.

Second, the communication unit 310 transmits various signals to the apparatuses coupled thereto through the signal line (radio or cable). The communication unit 310 transmits the control response command including a result controlled by the control command or the request response command including the information requested by the request command, to the EMS 200.

In a case where the communication between the EMS 200 and the object apparatus 300 is performed in the ECHONET Lite method, the communication unit 310 transmits the messages conforming to the ECHONET Lite method (SET response command, GET response command, INFO command), to the EMS 200.

According to the first embodiment, in a case where the request command includes the range acquisition property, the communication unit 310 transmits a command including range information indicating a range of a values relating to ability of the object apparatus 300 and an object property, as the request response command, in a case where the request command includes the range acquisition property. Here, in a case where the request command includes the range acquisition property, the communication unit 310 preferably transmits a command including a range classification indicating whether the values relating to the ability of the object apparatus 300 are continuous, as the request response command, in addition to the range information and the object property.

In this case, in a case where the range classification indicates that the values relating to the ability of the object apparatus 300 are continuous, the range information preferably includes a minimum value of the values relating to the ability of the object apparatus 300, a maximum value of the values relating to the ability of the object apparatus 300, and a step width of the values relating to the ability of the object apparatus 300. For example, in a case where the object apparatus 300 is an air conditioning equipment, when the values relating to the ability of the object apparatus 300 (transmission object value) are temperature set points, the range information includes a minimum value of the temperature set point (for example, 18° C.), a maximum value of the temperature set point (for example, 30° C.), and a step width (for example, 0.5° C. or 1° C.). Here, in an example of the air conditioning equipment, the temperature set points has been described as the values relating to the ability. The values relating to the ability are not limited to this. The values relating to the ability may be, for example, values relating to ability of airflow setting or values relating to humidity setting.

Meanwhile, in a case where the range classification indicates that the values relating to the ability of the object apparatus 300 are discontinuous, the range information preferably includes the number of the values relating to the ability of the object apparatus 300 and immediate values of the values relating to the ability of the object apparatus 300. For example, in a case where the object apparatus 300 is the air conditioning equipment, when the values relating to the ability of the object apparatus 300 (transmission object value) are the operation modes, the range information includes the number of actual operation modes included in the air conditioning equipment and an immediate value of a value indicating the actual operation modes included in the air conditioning equipment.

Here, the immediate value of the values relating to the ability of the object apparatus 300 are values directly indicating the values relating to the ability of the object apparatus 300 (for example, code). The range information may include only a value relating to an actual ability included in the object apparatus 300, in the values relating to the ability of the object apparatus 300 (transmission object value), namely, values defined by the standards and the like. Alternatively, the range information may include the values relating to the ability of the object apparatus 300 (transmission object value), namely, all values defined by the standards and the like. Information indicating whether the object apparatus 300 actually includes the ability, may be information in association with each transmission object value.

The control unit 320 controls an action of the object apparatus 300. Specifically, the control unit 320 controls the action of the object apparatus 300 in response to a command received from the EMS 200.

(Exemplary Message Formats)

Figure 4:
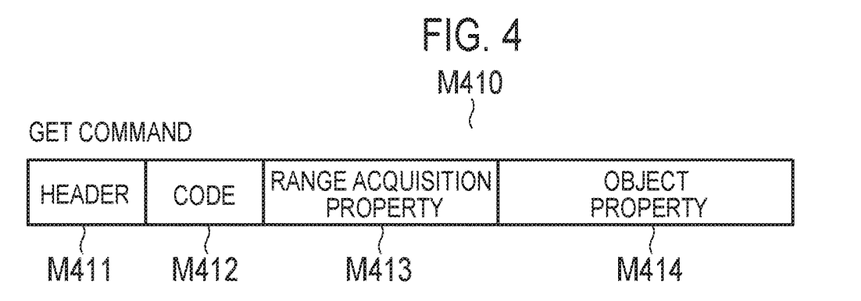
FIG. 4 is a diagram of an exemplary message format according to the first embodiment.
Figure 5:
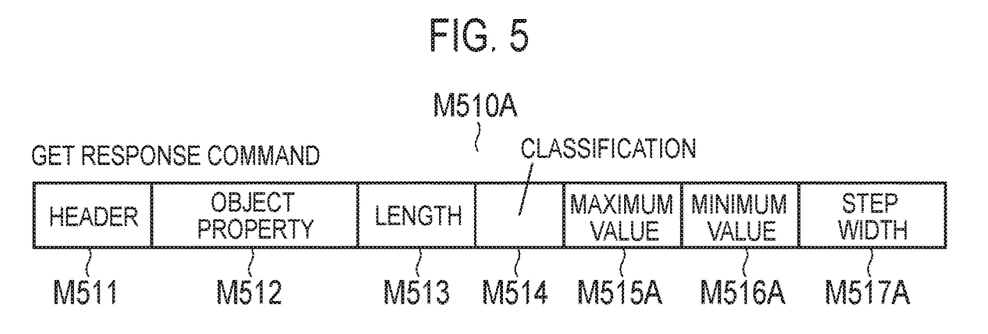
FIG. 5 is a diagram of another exemplary message format according to the first embodiment.
Figure 6:
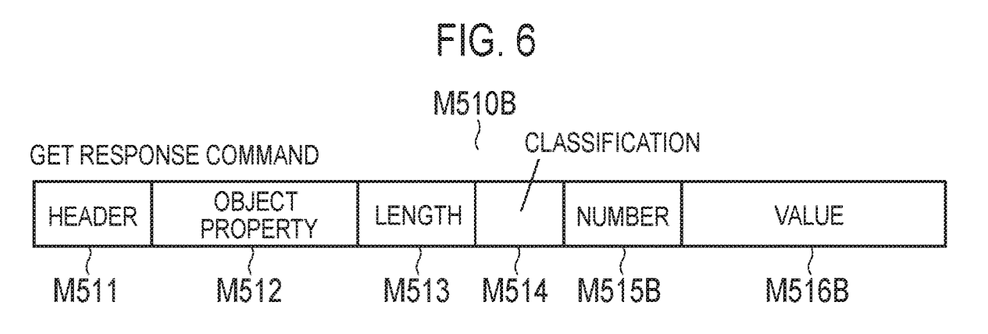
FIG. 6 is a diagram of still another exemplary message format according to the first embodiment.

Exemplary message formats according to the first embodiment will be described below. FIGS. 4 to 6 are diagrams of the exemplary message formats according to the first embodiment. Here, the message formats used in the ECHONET Lite method will be described.

First, an exemplary GET command M410 to be transmitted from the EMS 200 to the object apparatus 300, will be described with reference to FIG. 4.

As illustrated in FIG. 4, the GET command M410 includes a header M411, a code M412, a range acquisition property M413, and an object property M414.

The header M411 is information indicating, for example, a destination of the GET command M410. The code M412 is information indicating a classification of a message including the code M412. Here, the code M412 is a message indicating that the message including the code M412 is the GET command. The range acquisition property M413 is information requesting a range of the value relating to the actual ability included in the object apparatus 300 in the values relating to the ability of the object apparatus 300 (transmission object value). The object property M414 is information indicating object content in a range to be known to the EMS 200.

Second, an exemplary GET response command M510A to be transmitted from the object apparatus 300 to the EMS 200 will be described with reference to FIG. 5. The GET response command M510A includes the range information indicating a range of continuous values relating to the ability.

As illustrated in FIG. 5, the GET response command M510A includes a header M511, an object property M512, a length M513, a classification M514, a maximum value M515A, a minimum value M516A, and a step width M517A.

The header M511 is information indicating, for example, a destination of the GET response command M510A. The object property M512 is information indicating object content in a range to be known to the EMS 200. That is, the object property M512 is information indicating object content corresponding to the range information included in the GET response command M510A. The length M513 is information indicating the length of the range information (bit length) included in the GET response command M510A. The classification M514 is information indicating whether the values relating to the ability of the object apparatus 300 are continuous. The classification M514 can be expressed by one bit ("0" or "1").

The maximum value M515A is information indicating a maximum value of the values relating to the ability of the object apparatus 300. The minimum value M516A is information indicating a minimum value of the values relating to the ability of the object apparatus 300. The step width M517A is information indicating a step width of the values relating to the ability of the object apparatus 300. The maximum value M515A, the minimum value M516A, and the step width M517A are included in the range information indicating the range of the values relating to the ability of the object apparatus 300.

Third, an exemplary GET response command M510B to be transmitted from the object apparatus 300 to the EMS 200, will be described with reference to FIG. 6. The GET response command M510B includes the range information indicating a range of discontinuous values relating to the ability.

As illustrated in FIG. 6, the GET response command M510B includes the header M511, the object property M512, the length M513, the classification M514, a number M515B, and a value M516B.

The header M511, the object property M512, the length M513, and the classification M514 are the same as in FIG. 5, and the descriptions of information elements thereof will be omitted.

The number M515B is information indicating the number of the values relating to the ability of the object apparatus 300, included in the GET response command M510B. The number M516B is information indicating the immediate value of the values relating to the ability of the object apparatus 300. The number M515B and the value M516B are included in the range information indicating the range of the values relating to the ability of the object apparatus 300.

The value M516B may include only a value corresponding to the actual ability included in the object apparatus 300 in the values relating to the ability of the object apparatus 300 (transmission object value), namely, the values defined by the standards and the like. The value M516B may include the values relating to the ability of the object apparatus 300 (transmission object value), namely, all the values defined by the standards and the like. The information indicating whether the object apparatus 300 actually includes the ability, may be information in association with each transmission object value.

As illustrated in FIGS. 5 and 6, the range information has a variable length. Thus, note that the length M513 indicating the length of the range information (bit length) is required. The GET response command 510A and the GET response command 510A may include an end code indicating an end position of the range information, instead of the length M513.

(Control Method)

Figure 7:
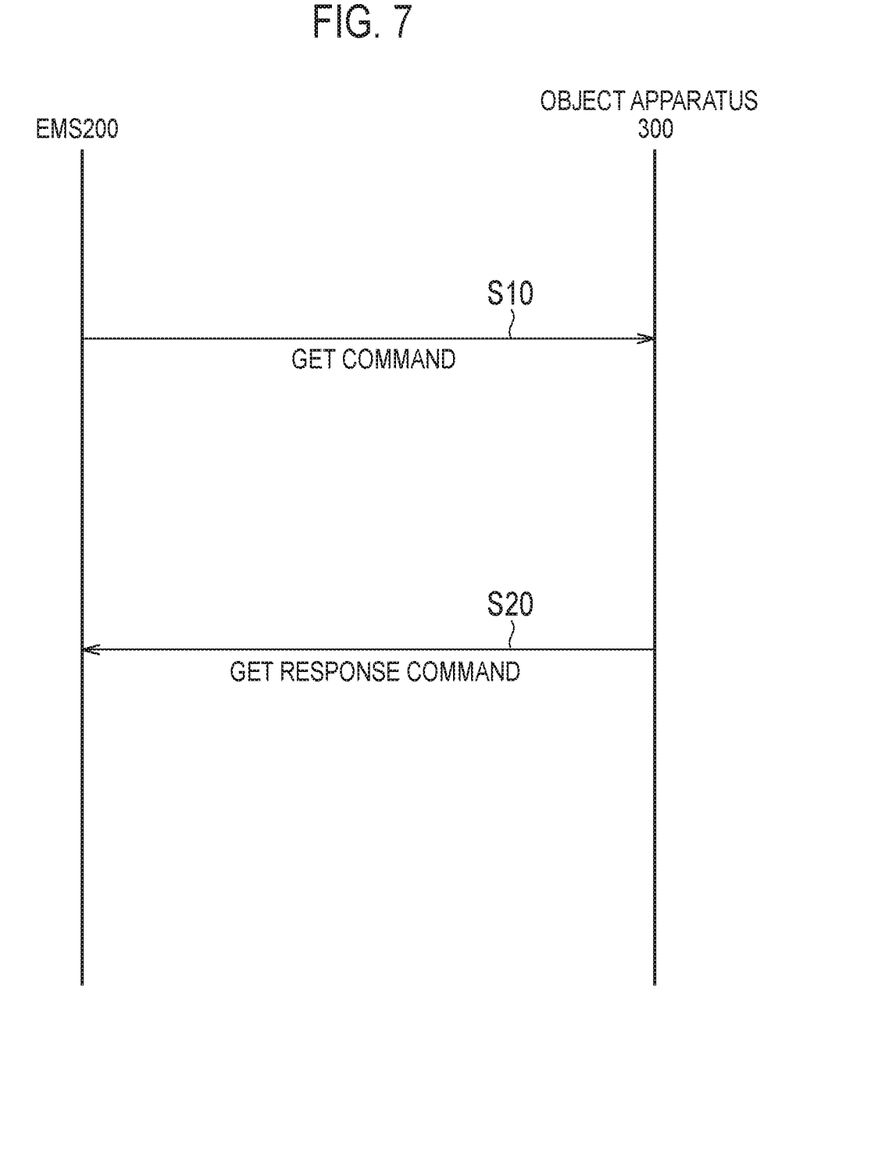
FIG. 7 is a sequence diagram of a control method according to the first embodiment.

A control method according to the first embodiment will be described below. FIG. 7 is a sequence diagram of the control method according to the first embodiment. A case where the communication between the EMS 200 and the object apparatus 300 is performed in the ECHONET Lite method, will be exemplified in FIG. 7.

As illustrated in FIG. 7, at Step S10, the EMS 200 transmits the request command (GET command) requesting information indicating a state of the object apparatus 300, to the object apparatus 300. Here, in a case where the values relating to the ability of the object apparatus 300 are acquired, the EMS 200 transmits a command including the range acquisition property and the object property (for example, GET command illustrated in FIG. 4) as the request command.

At Step S20, the object apparatus 300 transmits the request response command (GET response command) including information requested by the request command (GET command), to the EMS 200. Here, in a case where the range acquisition property is included in the GET command, the object apparatus 300 transmits a command including the range information and the object property, as the request response command. For example, in a case where the values relating to the ability of the object apparatus 300 are continuous, the object apparatus 300 transmits the GET response command illustrated in FIG. 5, to the EMS 200. Meanwhile, in a case where the values relating to the ability of the object apparatus 300 are discontinuous, the object apparatus 300 transmits the GET response command illustrated in FIG. 6, to the EMS 200.

As described above, according to the first embodiment, the EMS 200 can request the range of the values relating to the ability of the object apparatus 300, from the object apparatus 300 by only adding the range acquisition property to the request command (namely, existing message) that requests the information indicating the state of the object apparatus 300. Accordingly, the EMS 200 can grasp the range of the values relating to the ability of the object apparatus 300 in advance, inhibiting an alteration with respect to the existing message format, minimally.

Other Embodiments

The present invention has been described in the above embodiment. It should not be understood that the descriptions and the drawings included in a part of this disclosure are limited the present invention. The disclosure clarifies various alternative embodiments, examples, and investment techniques for persons skilled in the art.

According to the embodiment, a case where the communication between the EMS 200 and the object apparatus 300 is performed in the ECHONET Lite method, has been mainly described. However, the embodiment is not limited to this. The communication between the EMS 200 and the object apparatus 300 may conform to another communications protocol.

Although not having been described in the embodiment, in a case where the range acquisition property is not included in the request command, the communication unit 310 transmits the request response command including information indicating the state of the object apparatus 300 instead of the request response command including the range information and the object property.

According to the embodiment, in a case where the range acquisition property is included in the request command, the communication unit 310 transmits the request response command including the range information and the object property. However, the embodiment is not limited to this. In a case where the object apparatus 300 is anew coupled to the EMS 200, the communication unit 310 may autonomously transmit a command including the range information and the object property. In the ECHONET Lite method, the INFO command can be used as the above command.

According to the embodiment, a case where the control apparatus is the EMS 200 has been exemplified. However, the embodiment is not limited to this. The control apparatus may be provided in a building energy management system (BEMS), may be provided in a factory energy management system (FEMS), or may be provided in a store energy management system (SEMS).

According to the embodiment, the consumer's facility 10 includes the load 120, the PV unit 130, the storage battery unit 140, the fuel cell unit 150, and the hot-water storage unit 160. However, the consumer's facility 10 may include any of the load 120, the PV unit 130, the storage battery unit 140, the fuel cell unit 150, and the hot-water storage unit 160.

Note that the entire disclosure in Japanese Patent Application No. 2014-7718, filed Jan. 20, 2014, is incorporated herein by reference.

INDUSTRIAL APPLICABILITY

According to the embodiment, a control system, a control apparatus, an object apparatus, and a control method can be provided, the control system being capable of causing the control apparatus to grasp, in advance, a range of a value relating to a ability of the object apparatus, inhibiting an alteration with respect to an existing message format, minimally.

The invention claimed is:

1. A control system comprising:
    a control apparatus comprising
        a first transmitter configured, to transmit a request command to an object apparatus comprising at least one of a photovoltaic power generation apparatus, a fuel cell apparatus, or a hot water storage apparatus, wherein the request command comprises
            a first information element that requests a second information element indicating a state of the object apparatus, wherein the state comprises at least one of a power generation amount of the photovoltaic power generation apparatus, a power generation amount of the fuel cell apparatus, or a hot-water storage amount of the hot-water storage apparatus,
            a range acquisition information element that requests a range of values relating to an ability of the object apparatus, wherein the range of values comprises operation modes of the object apparatus, and
            an object information element that indicates object content of the range,
        a first receiver configured to receive a request response command from the object apparatus, wherein the request response command comprises
            the second information element requested by the first information element, a range information element indicating the range, and the object information element, and
        a controller configured to control the object apparatus based on the second information element, the range information element, and the object information element; and
    the object apparatus comprising
        a second receiver configured to receive the request command from the control apparatus, and
        a second transmitter configured to transmit the request response command to the control apparatus, in response to reception of the request command.

2. The control system according to claim 1, wherein the request response command further comprises a range classification indicating whether the values relating to the ability are continuous.

3. The control system according to claim 2, wherein the range information element includes at least one of values indicating a minimum value and a maximum value of the values relating to the ability, in a case where the range classification indicates that the values relating to the ability are continuous.

4. The control system according to claim 2, wherein the range information element includes a value indicating a step width of the values relating to the ability, in a case where the range classification indicates that the values relating to the ability are continuous.

5. The control system according to claim 3, wherein the range information element includes a value indicating a step width of the values relating to the ability, in a case where the range classification indicates that the values relating to the ability are continuous.

6. The control system according to claim 2, wherein the range information element includes a number of the values relating to the ability, in a case where the range classification indicates that the values relating to the ability are discontinuous.

7. The control system according to claim 2, wherein the range information element includes immediate values of the values relating to the ability, in a case where the range classification indicates that the values relating to the ability are discontinuous.

8. The control system according to claim 4, wherein the range information element includes immediate values of the values relating to the ability, in a case where the range classification indicates that the values relating to the ability are discontinuous.

9. A control apparatus configured to communicate with an object apparatus provided in a facility, comprising:
   a transmitter configured to transmit a request command to the object apparatus, wherein the object apparatus comprises at least one of a photovoltaic power generation apparatus, a fuel cell apparatus, or a hot-water storage apparatus, and wherein the request command comprises
      a first information element that requests a second information element indicating a state of the object apparatus, wherein the state comprises at least one of a power generation amount of the photovoltaic power generation apparatus, a power generation amount of the fuel cell apparatus, or a hot-water storage amount of the hot-water storage apparatus,
      a range acquisition information element that requests a range of values relating to an ability of the object apparatus, wherein the range of values comprises operation modes of the object apparatus, and
      an object information element indicating object content of the range;
   a receiver configured to receive a request response command from the object apparatus, wherein the request response command comprises
      the second information element requested by the first information element,
      a range information element indicating the range, and
      the object information element and
   a controller configured to control the object apparatus based on the second information element, the range information element, and the object information element.

10. An object apparatus provided in a facility and configured to receive a command from a control apparatus, comprising:
   at least one of a photovoltaic power generation apparatus, a fuel cell apparatus, or a hot-water storage apparatus;
   a receiver configured to receive a request command from the control apparatus, wherein the request command comprises
      a first information element that requests a second information element indicating a state of the object apparatus, wherein the state comprises at least one of a power generation amount of the photovoltaic power generation apparatus, a power generation amount of the fuel cell apparatus, or a hot-water storage amount of the hot-water storage apparatus,
      a range acquisition information element that requests a range of values relating to an ability of the object apparatus, wherein the range of values comprises operation modes of the object apparatus, and
      an object information element that indicates object content of the range; and
   a transmitter configured to transmit a request response command to the control apparatus, in response to reception of the request command, wherein the request response command comprises
      the second information element requested by the first information element,
      a range information element indicating the range, and
      the object information element,
   wherein the object apparatus is controlled by the control apparatus based on the second information element, the range information element, and the object information element.

11. A control method used in a control system including an object apparatus provided in a facility and a control apparatus configured to communicate with the object apparatus by transmitting a command to the object apparatus, the control method comprising:
   transmitting a request command, from the control apparatus to the object apparatus, wherein the object apparatus comprises at least one of a photovoltaic power generation apparatus, a fuel cell apparatus, or a hot water storage apparatus, and wherein the request command comprises
      a first information element that requests a second information element indicating a state of the object apparatus, wherein the state comprises at least one of a power generation amount of the photovoltaic power generation apparatus, a power generation amount of the fuel cell apparatus, or a hot-water storage amount of the hot-water storage apparatus
      a range acquisition information element that requests a range of values relating to an ability of the object apparatus, wherein the range of values comprises operation modes of the object apparatus, and
      an object information element that indicates object content of the range;
   transmitting a request response command, from the object apparatus to the control apparatus, in response to reception of the request command, wherein the request response command comprises
      the second information element requested by the first information element,
      a range information element indicating the range, and
      the object information element and,
   by the control apparatus, controlling the object apparatus based on the second information element, the range information element, and the object information element.

* * * * *